No. 653,100. Patented July 3, 1900.
W. J. LANG.
CORN HARVESTER.
(Application filed Apr. 21, 1897.)
(No Model.) 7 Sheets—Sheet 1.

WITNESSES
W. E. Allen.
Victor J. Evans.

INVENTOR
Wm. J. Lang.
by John Wedderburn
Attorney

No. 653,100. Patented July 3, 1900.
W. J. LANG.
CORN HARVESTER.
(Application filed Apr. 21 1897.)
(No Model.) 7 Sheets—Sheet 2.

No. 653,100. Patented July 3, 1900.
W. J. LANG.
CORN HARVESTER.
(Application filed Apr. 21, 1897.)
(No Model.) 7 Sheets—Sheet 3.

FIG. 3.

Witnesses
W. E. Allen
Victor J. Evans

Inventor
Wm. J. Lang.
By John Wedderburn, Attorney

No. 653,100. Patented July 3, 1900.
W. J. LANG.
CORN HARVESTER.
(Application filed Apr. 21, 1897.)

(No Model.) 7 Sheets—Sheet 5.

WITNESSES
W. E. Allen
Victor J. Evans

INVENTOR
Wm. J. Lang.
By John Wedderburn.
Attorney

No. 653,100. Patented July 3, 1900.
W. J. LANG.
CORN HARVESTER.
(Application filed Apr. 21, 1897.)

(No Model.) 7 Sheets—Sheet 6.

Witnesses
W. E. Allen.
Victor J. Evans.

Inventor
Wm. J. Lang.
By John Wedderburn.
Attorney

UNITED STATES PATENT OFFICE.

WILLIAM J. LANG, OF OYENS, IOWA.

CORN-HARVESTER.

SPECIFICATION forming part of Letters Patent No. 653,100, dated July 3, 1900.

Application filed April 21, 1897. Serial No. 633,176. (No model.)

*To all whom it may concern:*

Be it known that I, WILLIAM J. LANG, a citizen of the United States, residing at Oyens, in the county of Plymouth and State of Iowa, have invented certain new and useful Improvements in Corn-Harvesters; and I do hereby declare the following to be a full, clear, and exact description of the invention, such as will enable others skilled in the art to which it appertains to make and use the same.

This invention relates to improvements in corn-harvesters.

The main and primary object of the invention is to provide a harvester of the class mentioned embodying in its construction simple and efficient means for husking the ears of corn while the stalks are standing in the field and to so operate thereupon that the stalks may remain standing after the ears have been detached therefrom.

A further object of the invention is to so construct the machine that the ears shall be positively fed to the husking mechanism, where the former shall be effectively operated upon, so that the same may be broken from the shuck and subsequently conveyed to an elevator for deposit at a suitable point.

A further object of the invention is to provide improved means for adjusting the husking mechanism, whereby the machine is adapted for various conditions of the corn, and, further, to also provide means by which the bearing-wheels may be adjusted to properly position the body of the machine with relation to the corn.

With these and other objects in view, which will appear as the nature of the improvements is better understood, the invention consists, substantially, in the novel construction, combination, and arrangement of parts, as will be hereinafter fully described, illustrated in the accompanying drawings, and pointed out in the claims hereto appended.

In the accompanying drawings, Fig. 2 is a similar view looking at the machine from the side opposite to that shown in Fig. 1. Fig. 8 is a detail sectional plan view on the line 8 8, Fig. 2. Fig. 9 is a detail perspective view of the pole and the means for connecting it to the machine.

Similar numerals of reference designate corresponding parts throughout the several figures of the drawings.

Referring to the drawings, 1 designates the machine-frame, which is substantially rectangular, and said frame comprises a series of longitudinal beams 2, which beams are arranged in pairs and parallel, as shown, the beams of each pair being spaced a sufficient distance from each other to provide for the accommodation of the various parts of the operating mechanism, and at the ends of the beams 2 transverse connecting-beams 3 are arranged, by which said longitudinal beams 2 are held in proper relation to each other and in rigid position.

4 designates the driving-wheel, which wheel is mounted upon a suitable shaft 5, having at each of its ends a pinion 6, and said pinions 6 are disposed within segmental frames 7, one side of which is provided with inwardly-extending teeth 8, adapted to be engaged by the pinions 6 for purposes of adjustment, and by reason of the pinions 6 engaging the teeth 8 it is obvious that the driving-wheel 4 may be elevated or lowered with proper relation to the corn to be operated upon. It will be noted at this point, however, that a supplemental bearing-beam 9 is employed, which extends longitudinally of the frame 1 and lies within the pair of beams 2, between which the driving-wheel 4 is disposed, and this supplemental beam 9 supports the inner frame 7, in which the inner end of the shaft 5 is disposed.

Figures 1, 15, 16:
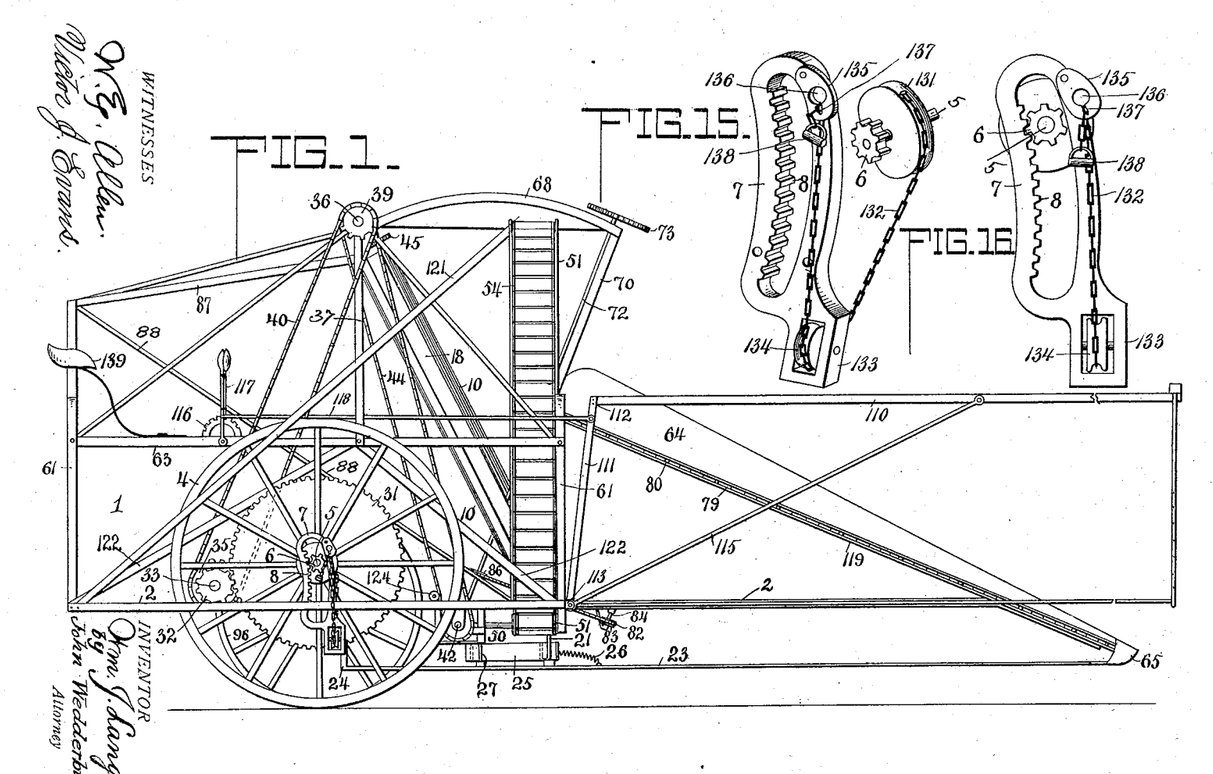
Figure 1 is a side elevation of a corn-harvester constructed in accordance with the present invention.
Fig. 15 is a detail perspective view of the means employed for adjusting the driving-wheel in the machine-frame.
Fig. 16 is a side elevation thereof.
Figures 2, 8, 9:
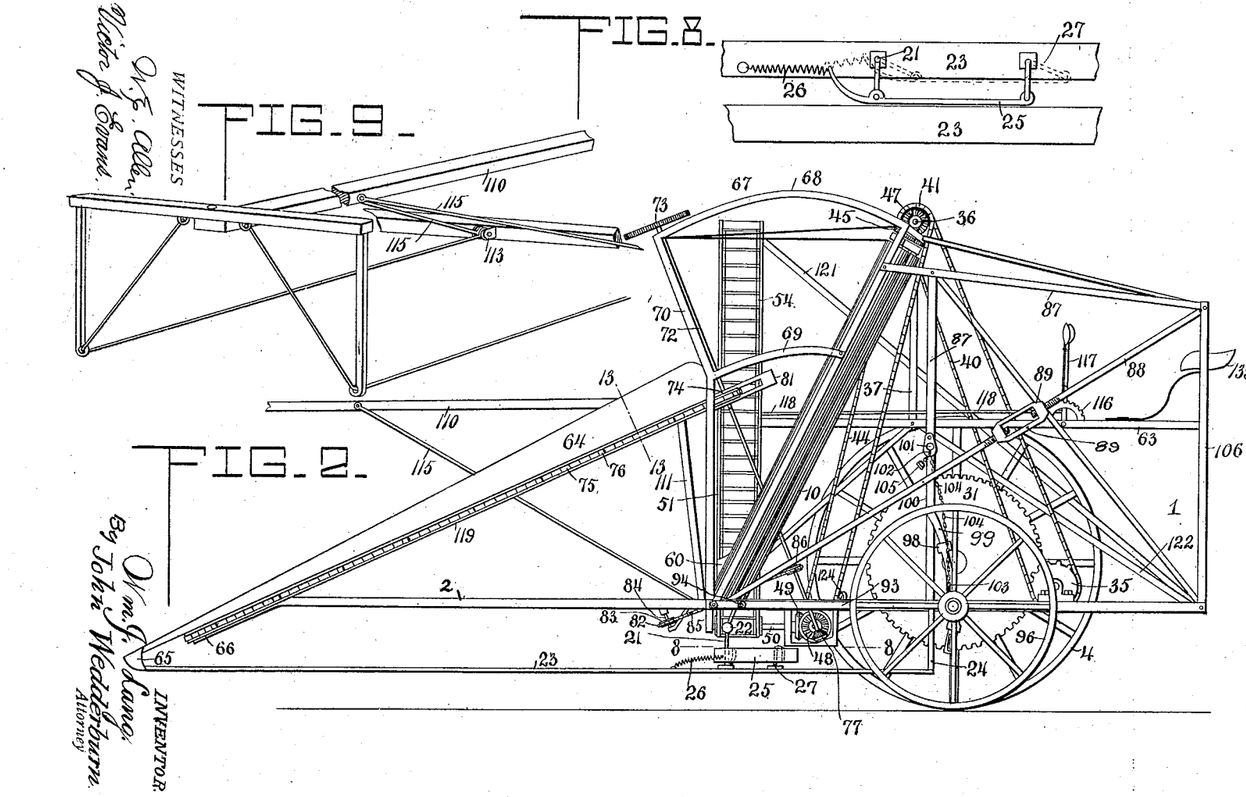
Figure 3:
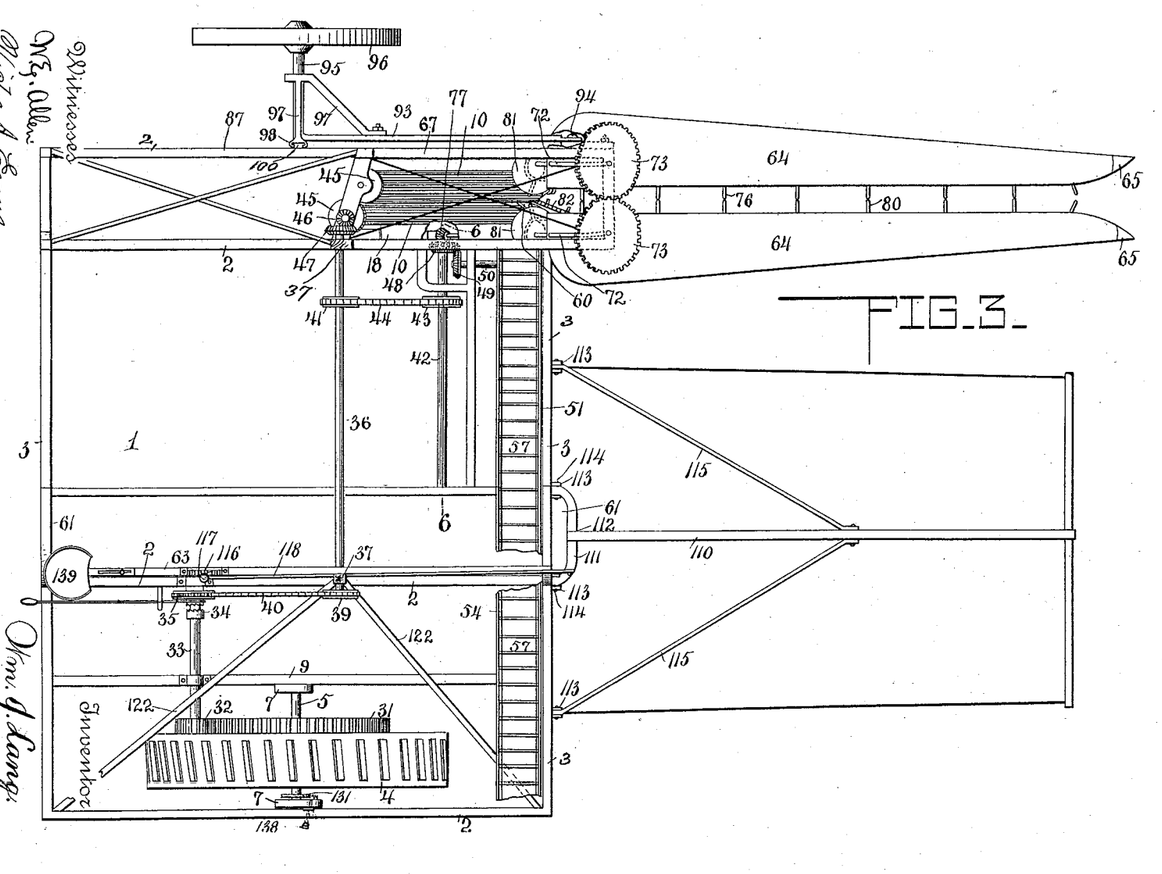
Fig. 3 is a top plan view of the machine.

The husking mechanism is operated by the driving-wheel 4 through suitable gearing, to be hereinafter fully described, and referring in detail to the husking mechanism it will be seen that the same comprises a pair of longitudinally-corrugated husking-rolls 10, arranged at the side of the frame 1, which is opposite to that in which the driving-wheel 4 is journaled, said husking-rolls being journaled at the forward end of the machine between the pair of longitudinal beams 2 thereat, the forward ends of the latter being extended in advance of the frame 1, as clearly shown in Figs. 1 and 2, for a purpose to be presently stated. A bearing-frame is provided for the reception of the husking-rolls 10, and said frame comprises a pair of parallel-spaced side pieces 12, which may be formed of steel tubing or other suitable material, and said side pieces 12 are connected at their upper ends by a transverse head-block 13, which head-block is provided with openings through which the shafts 14 of the rolls 10 pass, and it will be noted at this point that the rolls 10 are preferably formed of malleable iron and are cast upon the shafts 14. The diameter of the shafts 14 is less than that of the rolls 10, and the latter have their lower ends tapered downwardly to correspond with the diameter of the lower ends of the shafts 14, whereby the stalks of corn are readily fed between the husking-rolls, and said lower ends of the shafts 14 are received by journal-blocks 15. Each of the journal-blocks 15 is substantially triangular in shape, and at the apex thereof is formed a bearing 16, in which the lower ends of the shafts 14 are fitted, an elongated cavity 17 being also formed in each of the journal-blocks 15 and adapted to receive the lower ends of the side pieces 12. The journal-blocks 15 are bolted or otherwise secured to the pair of longitudinal beams 2 at the end of the frame in which the husking-rolls 10 are journaled, and which beams, for the sake of distinction, will be hereinafter termed "roll-beams." The outer one of the journal-blocks 15 is arranged in advance of the inner one, and by reason of this construction it will be observed that the outer one of the husking-rolls 10 is also arranged in advance of the inner one thereof, the outer roll overlapping the latter and having its inner edge disposed directly in front of the axis of the inner roll. The husking-rolls 10 are inclined rearwardly at an angle of substantially thirty-seven degrees, the bearing-frame 11 being necessarily inclined at a similar angle, and the corrugations on each of the rolls 10 are so arranged that the same will lie opposite to the corrugations on the other roll, whereby the ribs of the rolls are also adapted to be opposite to one another, but spaced sufficiently to allow the free passage of the cornstalks. By arranging the husking-rolls 10 within the bearing-frame 11 so that the outer of said rolls is in advance of the inner one it is apparent that said rolls are disposed at an acute angle to the line of draft of the machine, and hence as the stalks pass between the rolls the ears will first contact with the outer one of the latter. The husking operation begins as the machine continues to move forwardly and the stalks pass farther between the husking-rolls, so that the shucks of the ears will be gripped by the longitudinal ribs and thereby effect a secure fastening thereon. With the rolls thus gripped upon the shucks and the space between the former being such that the stalks and shucks will be firmly compressed by the ribs of the rolls it is obvious that the ears will experience great difficulty in following the stalks, so that when the ends of the ears upon which the shucks are formed contact with the outer one of the husking-rolls the shucks will be immediately broken therefrom and the husks will be separated from the ears and continue their passage between the rolls, but the ears themselves be prevented following the same.

In order to properly guide the ears in their relation to the husking-rolls 10 above indicated, a hinged deflector-board 18 is arranged at the inner side of the bearing-frame 11, and said board 18 has projecting from its upper and lower ends shaft extensions 19, which extensions are received by suitable bearings 20, formed in the head-block 13 and the inner journal-block 15, the lower end of the lower shaft extension 19 passing through said journal-block and being connected to a crank-shaft 21 by a universal joint 22 of any approved construction.

23 designates a pair of longitudinally-extending guide-boards which lie at a slight distance above the surface of the ground and project forwardly of the frame 1 beneath the projecting ends of the roll-beams 2, the forward ends of said guide-boards being flared to facilitate the passage of the cornstalks therebetween, and the rear ends of said guide-boards are connected to the roll-beams by means of suitable hangers 24. The guide-boards 23 support the mechanism for operating the deflector-board 18, and by referring to Fig. 8 this mechanism will be readily understood. The crank-shaft 21 has its lower end journaled in a suitable bearing mounted upon the inner one of the guide-boards 23, and its crank-arm is pivotally connected to a swinging shoe 25, which shoe is preferably formed of spring material and has its forward end pointed and connected to a coil-spring 26, firmly attached to the inner guide-board 23. The rear end of the swinging shoe 25 has pivotally connected thereto an inverted-U-shaped crank 27, the inner arm of which is pivoted upon the inner guide-board 23 and in alinement with the crank-shaft 21, so that as the shoe 25 swings away from the outer guide-board 23 it will be seen that the cranks on the crank-shaft 21 and the crank 27 are swung simultaneously. By means of the universal joint 22 it is evident that the deflector-board 18, which is arranged at an incline, may be easily operated by the vertically-arranged crank-shaft 21, and hence as the cornstalks pass between the guide-boards 23 during the passage of the machine said stalks contact with the swinging shoe 25 and force the same toward the inner guide-board 23. During this movement of the shoe 25 the crank-shaft 21, which is connected with the lower shaft extension 19, is operated and the deflector-board 18 swung toward the outer husking-roll 10. By reason of this movement of the deflector-board 18 the ears of corn will strike the husking-rolls at an acute angle to a line drawn through their axes, so that the shucks may be readily broken therefrom, the side of the shuck adjacent to the inner roll becoming severed before that adjacent to the outer roll; but immediately when the stalk being operated upon clears the swinging shoe 25 it is apparent that the coil-spring 26 will return said shoe to its normal position and also swing the deflector-board to its normal position, a guide-board 28 being attached to the inner side of the bearing-frame 11 and provided with a curved edge 29, against which the outer curved edge 30 of the deflector-board 18 rests. When the deflector-board has assumed this position, a downwardly-inclined trough is formed which receives the ears of corn after the husks have been removed therefrom and carries the same to an elevator, to be presently described.

The foregoing description relates particularly to the husking mechanism; but in order that the same may be operated to properly act upon the ears of corn the driving-wheel 4 is provided at its inner side with a master gear-wheel 31, which meshes with a pinion 32, carried by a counter-shaft 33, journaled between the supplemental bearing-beam 9 and the inner one of the longitudinal beams 2 at the end of the machine in which the driving-wheel 4 is arranged. A clutch 34 of any approved construction is carried by the shaft 33, and loosely mounted upon the latter is a sprocket-wheel 35, adapted to be locked into engagement with the shaft 33 through the clutch 34. A superposed counter-shaft 36 extends across the machine adjacent to the upper ends of the husking-rolls 10, said shaft being journaled in bearings formed in the upper end of a bar 37 and in the projecting upper end of the nearest side bar 12 of the roll-frame. A sprocket-wheel 39 is mounted upon one end of the shaft 36 and is in alinement with the sprocket-wheel 35, a sprocket-chain 40 passing over the wheels 35 and 39 and imparting motion to the shaft 36 from the counter-shaft 33. At the end of the shaft 36 adjacent to the husking-rolls 10 a sprocket-wheel 41 is provided, and journaled to the frame adjacent to its forward end is a counter-shaft 42, upon which a sprocket-wheel 43 is mounted, a chain 44 traveling over the wheels 41 and 43.

The upper ends of the shafts 14 of the husking-rolls 10 are provided with pinions 45, and said pinions are adapted to mesh with each other, so that the husking-rolls 10 are adapted to simultaneously rotate. A beveled pinion 46 is secured to the extremity of the upper end of the inner shaft 14, which pinion 46 meshes with a beveled pinion 47, secured to the extremity of the shaft 36 adjacent to the husking-rolls, and it will thus be seen that by reason of the pinions 46 and 47 meshing with each other the husking-rolls 10 are adapted to receive their rotation from the shaft 36.

A double-beveled pinion 48 is mounted upon the counter-shaft 42 at one of its ends, and one face of said pinion meshes with a beveled pinion 49, carried by a counter-shaft 50, which extends longitudinally of the frame 1, but is arranged in front of the shaft 42 at right angles to the latter. A transversely-extending conveyer-trough 51 has its lower end arranged immediately above the shaft 50, said trough being upwardly inclined and having its upper end lying in a substantially-horizontal plane, and mounted upon the shaft 50 is a pair of sprocket-wheels 52, a similar pair of wheels 53 being journaled in the extreme upper end of the conveyer-trough 51, which projects beyond the side of the frame 1, in which the driving-wheel 4 is journaled. The purpose of thus disposing the conveyer-trough 51 is to position its upper end so that the corn may be discharged therefrom into a wagon which travels beside the machine. A pair of conveyer-chains 54 travel over the wheels 52 and 53, and in order that said chains may be supported at the point where the horizontal portion of the trough 51 is connected with the inclined portion thereof a pair of parallel shafts 55 are employed, each of which is provided with a pair of sprocket-wheels 56, and by reason of these wheels 56 it will be seen that the chains 54, as the latter move upwardly and return, are retained in supported position. In practice the lower shaft 55 will be provided with a roller having a circumferential groove through which the cups may pass while the chain proper runs on the periphery of said roller. A series of cups 57 is carried by the chains 54 at spaced intervals, and each of said cups is formed of a series of substantially-triangular fingers 58, which are connected to the chains 54 in any suitable manner, the cup proper, 59, being secured to the fingers 58 and is preferably concave, as shown. Each of the cups 57 is, however, open at both of its ends, so as to accommodate different lengths of ears, and hence the latter are adapted to always lie in a proper position within the cups as the cups receive the same. As before stated, the lower end of the trough 51 is arranged over the counter-shaft 50, and the latter is in such relation to the lower ends of the husking-rolls 10 that the ears may descend therefrom and be received by the cups 57 after the husks have been removed, a receiving-funnel 60 being positioned at the lower end of the husking-rolls 10 and adapted to guide the ears to the cups 57.

The frame 1 is provided at its front and rear ends and at substantially its center with alined arches 61, which arches have secured adjacent to their upper ends brace-bars 62, the latter being bolted or otherwise secured within the arches, and the function of these arches is to permit the passage of the machine over the stalks of corn without liability of the latter being broken. A connecting brace-rod 63 extends longitudinally of the frame 1 and is secured to the upper ends of the arches 61. The bearings 37 are supported, as before stated, by the brace-arms 38.

Figures 4, 12, 13:
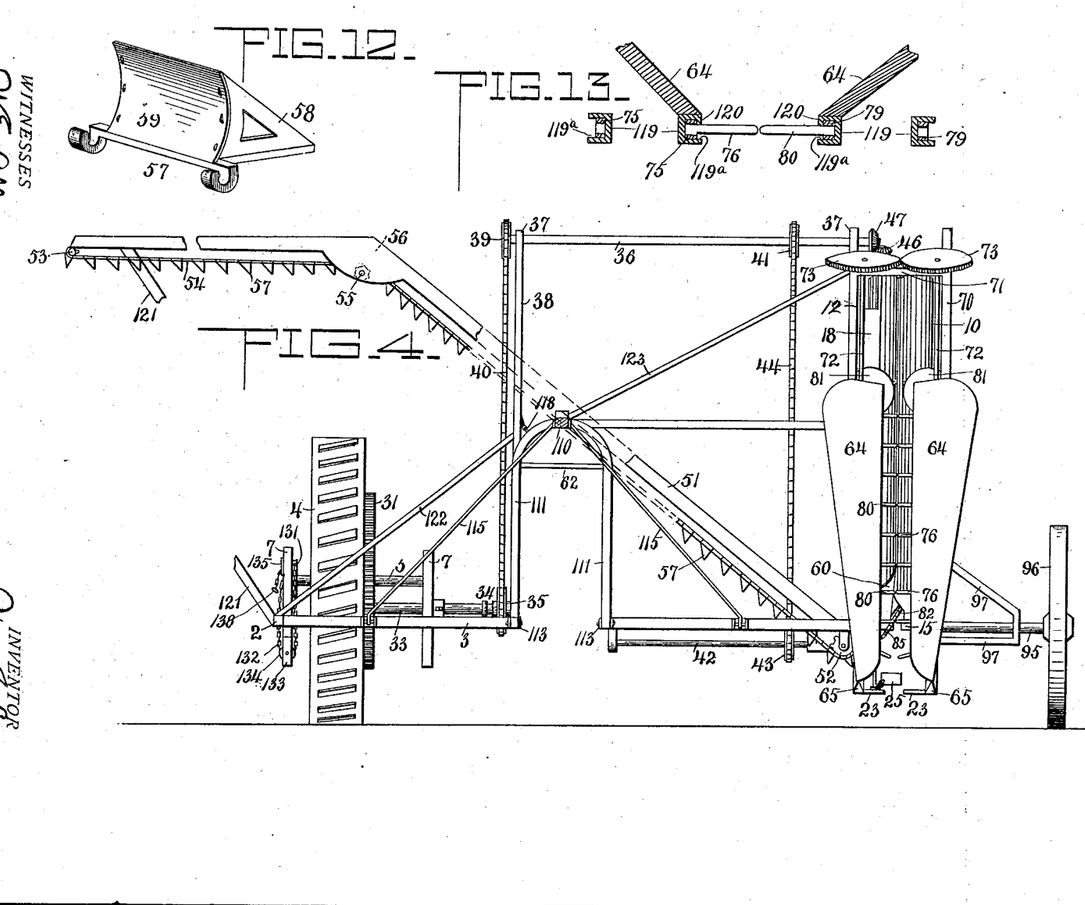
Fig. 4 is a front end elevation.
Fig. 12 is a similar view of one of the cups carried by the conveyer.
Fig. 13 is a transverse sectional view in detail on the line 13 13, Fig. 2.

Disposed above the forwardly-projecting ends of the roll-beams 2 is a pair of upwardly-inclined parallel-spaced divergent guide-wings 64, the lower ends of which lie adjacent to the forward ends of the guide-boards 23 and are connected thereto by means of cap-pieces 65, which are rounded on the lower side, so as to prevent the same entering the ground when the guide-boards 23 lie in close proximity thereto. At the outer end of each of the guide-wings 64 and suitably journaled between the same and the forward ends of the roll-beams 2 is a sprocket-wheel 66, and arranged in advance of the bearing-frame is a supporting-frame 67, said frame comprising a series of upper members 68 and a series of lower members 69, connected by uprights 70, the sides of said frame being connected by a transverse rib 71, and the rear ends of the upper and lower members 68 and 69 are suitably attached to the bearing-frame 11. The supporting-frame 67 has journaled in its forward end and at its sides a pair of downwardly-inclined shafts 72, upon the upper ends of which are secured gear-wheels 73, which mesh with each other for imparting simultaneous motion to the shafts 72. The outer one of the shafts 72 has its lower end terminating at a point just below the rear end of the outer guide-wing 64, and mounted on said lower end is a sprocket-wheel 74. A sprocket-chain 75 travels over the sprocket-wheels 66 and 74 and is provided with a series of spaced gathering-fingers 76. The inner one of the shafts 72 is extended and has its lower end terminating at a point opposite to the lower edge of the side of the double-beveled pinion 48, which is opposite to the side thereof engaged by the pinion 49. A beveled pinion 77 is rigidly secured to the lower end of the inner shaft 72; but it will be noted that the face of the pinion 77, which is of the smaller diameter, projects upwardly, and by reason of this is adapted to engage with the beveled pinion 48 at its lower edge. Through this engagement of the pinion 77 with the pinion 48 it is apparent that the shafts 72 will be rotated when the counter-shaft is operated by the driving-wheel 4 through the intermediate gearings. The inner shaft 72 is also provided with a sprocket-wheel 78, which is in substantially the same plane as the sprocket-wheel 74, carried by the outer shaft 72, and passing around the sprocket-wheel 78 and the sprocket-wheel 66, located at the forward end of the inner guide-wing 64, is a sprocket-chain 79, similar to the chain 75 and provided with gathering-fingers 80. The points of the gathering-fingers 76 and 80 are adapted to contact with each other, as clearly shown in Fig. 4, when said fingers are moving toward the husking-rolls 10, and the purpose of arranging the fingers in this manner is to provide a space which will inclose the entire number of stalks in each hill as the machine moves over the ground. The advantage of this arrangement will be seen when the stalks in the hills have been blown down or are otherwise separated, as the gathering-fingers will embrace the same at the forward extremity of the guide-wings 64, and during the rearward movement the same rise to a higher plane, and hence will cause the stalks to become bunched, so that the latter may be readily fed to the husking-rolls 10. A pair of guard-fingers 81 is mounted at the rear end of each of the guide-wings 64, said guard-fingers being formed of spring material and are adapted to prevent the cornstalks following the gathering-fingers as the latter move around the sprocket-wheels 74 and 78 and return to the forward end of the guide-wings 64. By arranging the guard-fingers 81 in pairs upon the guide-wings 64 the gathering-fingers may pass therebetween with facility and at the same time the stalks will be protected, and hence are more readily fed to the husking-rolls 10.

The swinging shoe 25 is arranged in vertical alinement with the lower end of the husking-rolls 10, so that the stalks will actuate the shoe to pass entirely between said rolls; but in order that the lower ends of the stalks may move between the lower tapered ends of the husking-rolls 10 with greater facility a sprocket-chain 82 travels over a sprocket-wheel 83, mounted upon a shaft 84, journaled between the inner guide-board 23 and the projecting end of the roll-beam 2 immediately thereabove, a series of guiding-fingers 85 being carried by the chain 82 and adapted to engage the stalks. The rear end of the chain 82 works upon a sprocket-wheel 86, mounted upon the inner shaft 72 between the sprocket-wheel 78 and the pinion 77. It will thus be seen that when said shaft 72 rotates motion is imparted to the chain 82 and the guiding-fingers carried thereby.

It will be noted that the journal-blocks 15 are spaced from each other at their inner end in order to permit the stalks passing therebetween, and it will also be understood that while the husking-rolls when spaced at a predetermined distance from each other are adapted to operate upon the corn when in certain conditions, yet the rolls must be adjusted at different times to suit varying conditions of the corn. This is accomplished by means of a trapeziform equalizing-frame 87, arranged at the side of the frame 1, upon which the husking-rolls 10 are located. The members of this frame are pivotally connected together by suitable means—such as bolts, for instance—and extending diagonally across the frame 87, from the upper rear end to the lower forward end thereof, is a sectional adjusting-rod 88, the ends of which are connected to the frame 87. The rod 88 is provided with a turnbuckle 89, which is mounted upon the adjacent ends of the members of the rod, and it will thus be seen that when the turnbuckle 89 is operated the frame 87 will also be adjusted. The outer one of the roll-beams 2 is connected to the equalizing-frame 87 at its lower end, as is likewise the bearing-frame 12. The latter is provided with a transversely-extending adjusting-bolt 90, having upon its ends clamping-nuts 91, and at the inner sides of the side pieces 12 the adjusting-bolt 90 is also provided with jam-nuts 92. By adjusting the jam-nuts 92 and the clamping-nuts 91 it will be seen that the sides of the bearing-frame 11 may be moved toward or away from each other; but this adjustment of the bolt 90 is only effected when the equalizing-frame 87 is to be adjusted. It will thus be seen that when the turnbuckle 89 is rotated, so that the members of the adjusting-rod 88 may be moved toward each other, the sides of the bearing-frame 11 will be so moved as to decrease the space between the husking-rolls 10; but reversing the movement of the turnbuckle 89 to that just described will cause the husking-rolls 10 to be moved from each other, and thus increase the space therebetween. This adjustment is necessary from the fact that, as before stated, the corn under varying conditions will require a larger space between the husking-rolls than at other times.

Figure 17:
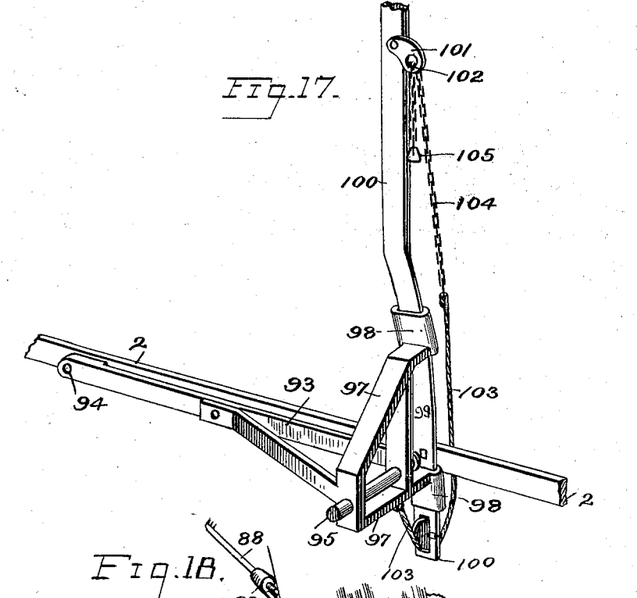
Fig. 17 is a perspective view illustrating in detail certain parts of the machine.
Figure 18:
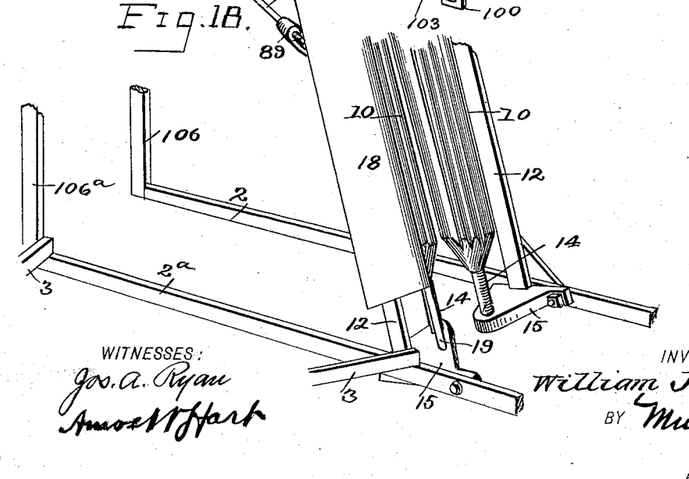
Fig. 18 is a perspective view illustrating certain details of construction of the frame of the machine.

In order that the side of the frame upon which the husking-rolls are located may be adjusted, so that the former may be elevated or lowered, as the case may be, an L-shaped arm 93 is provided, the forward end of which has a perforation, through which passes a stud 94, secured to the outer journal-block 15, and said stud 94 is adapted to be retained in the perforation of the arm 93 by a pin or other suitable means. The outwardly-projecting portion 95 of the arm 93 has journaled thereon a bearing-wheel 96, which, in conjunction with the driving-wheel 4, supports the machine above the ground; but in order that the portion 95 of the arm 93 may be suitably supported brace-arms 97 are employed, the same extending outward and forward and downward in horizontal and vertical planes, respectively. The inner side of the vertical portion of the brace is provided with a clamp 98, having a T-shaped groove, and the downwardly-extending brace 97 is provided with a similar clamp 98, also provided with a T-shaped groove, adapted to engage and slide upon the curved lower portion of a vertical bar 100, attached to the adjacent side bar 2 of the frame. The guide 99 forms an arc of a circle whose center is the stud 94, and by reason of the arm 93 being pivoted upon said stud it is evident that the former may be moved upwardly or downwardly upon the T-shaped guide 99 when it is necessary to lower or elevate the machine. The cable 103 is attached to the brace 97 (see Fig. 17) and, passing over a pulley journaled in the lower end of the curved guide-bar 99, extends thence upward to and connects with a chain 104, which is drawn through the keyhole-slot 102 of a plate 101, pivoted to the aforesaid bar 100. A knob or handle 105 is attached to the end of the chain for use in pulling the latter when it is desired to release it from the slot of plate 101, as required to adjust the shaft or axle 95 higher or lower. It is apparent that, since the shaft supports the machine on one side, the bracket 97 always presses upward and tends to slide upward on bar 100 and that such movement is resisted by the chain and cable, arranged as shown. It will be seen any link of the chain may lie in the narrow portion of the slot 102, and thus the next link on the outer side of the slot will engage the plate 101, so that the chain may be held locked or secured in any adjustment.

At the rear end of the frame 1, in the rear of the husking-rolls 10, an arch 106 is located, and arranged in the upper end of said arch is a bracket 107, adapted for bracing purposes, said bracket comprising a pair of oppositely-curved arms 108, connected at their central portions and having their ends connected by transverse bars 109. The bracket 107 is secured in the arch 106 by bolts or other suitable means, and by arranging said bracket at the upper end of the arch it will be observed that the lower end of the latter is prevented having any lateral movement.

A pole 110 is employed for attaching a team to the machine, and secured to the rear end of the pole 110 is an arch-frame 111, having a socket 112, receiving said end of the pole, and secured to the forward end of the frame 1 is a series of spaced couplings 113, through which pass a series of bolts or their equivalents 114. The lower ends of the arch-frame 111 are provided with eyes adapted to be inserted in the innermost of the couplings 113 and be secured therein by the bolts 114, and secured within the outermost of said couplings is a series of forwardly-extending brace-rods 115, the forward ends of which are connected to the pole 110 in advance of the rear end thereof. A segmental rack-bar 116 is secured to the connecting brace-rod 63, and also pivoted to the latter is an operating-lever 117, having a pawl or other suitable engagement with the teeth of the rack-bar 116. A pitman connection 118 extends from the operating-lever 117 to the upper end of the arch-frame 111 and is pivotally connected thereto in any suitable manner. By reason of the arch-frame 111 and the braces 115 being connected to the couplings 113 by the bolts 114 it will be seen that said frame and braces have a pivotal connection with the frame 1, and when the operating-lever 117 is moved forwardly the arch-frame 111 is also caused to move forwardly and away from the forward arch 61, the frame 111 corresponding thereto and being in alinement with said arch 61. By this forward movement of the arch-frame 111 and the tongue 110 it is apparent that the front of the machine will be elevated from the ground; but when the lever 117 is moved rearwardly, and consequently the arch-frame 111 is moved in this direction, the machine will descend, this adjustment being for the purpose of regulating the distance of the guide-bars 23 above the ground.

The gathering-fingers 76 and 80 are carried by the links of their respective chains; but in order that the chains as they pass upwardly and toward the husking-rolls 10 may be properly supported a guide-track 119 is arranged under the guide-wings 64, and said track has at its lower edge a bearing-surface 119ª and at its upper edge is provided with a depending flange 120. This track is preferably arranged only under the inner sides of the guide-wings 64; but, if desired, the track may extend entirely around the same, and it will be noted that when the links of the chains pass into the track the same are retained therein by means of the depending flanges 120, a suitable lubricant being placed upon the track to reduce the friction. A guide-track similar to the track 119 is also employed for the chain 82, so that the fingers 85 may be properly supported for operation upon the lower ends of the stalks.

The various parts of the machine may be suitably braced by any desired means; but that illustrated in the drawings is preferred, and it will be noted that in addition to the braces already referred to a series of upwardly-projecting brace-arms 121 may be arranged between the frame 1 and the horizontal portion of the conveyer, so that the latter is held in a rigid position, and a series of convergent brace-arms 122 may extend from the longitudinal beam at the outside of the driving-wheel 4 to the connecting-rod 63, and a similar series of braces 123 may be arranged between the rod 63 and the upper end of the bearing-frame 11.

As shown in the drawings, the pinions 6, carried by the shaft 5, are arranged within the segmental frames 7 and are adapted to engage with the teeth 8 thereof; but in order that the driving-wheel 4 may be adjusted in the frames 7 and locked at the points of adjustment a grooved wheel 131 is arranged on one side of the driving-wheel 4 and rigidly secured to the shaft 5. Secured in the groove of the wheel 131 at one side of its periphery is one end of a chain 132. Each of the segmental frames 7 is provided at its lower end with a pair of spaced lugs 133, and journaled between said lugs is a grooved wheel 134, the latter being at substantially right angles to the wheels 131, carried by the shaft 5. At the upper end of the frames 7 and at one side thereof is pivotally secured a depending locking-plate 135, which plate is provided with an opening 136, at one side of which is formed a slot 137. A handle 138 is secured to the outer end of each of the chains 132, and said outer ends of the chains are adapted to pass through the openings 136 and be locked in the slots 137 in a manner similar to the links of the cable for adjusting the bearing-wheel to the arm 93 thereof. It will be noted, however, that the grooved wheels 134 are in alinement with the wheels 131 at one side of the periphery of the latter, so that the chains 132 may be readily manipulated, and it will also be observed that the chains 132 wrap around the wheels 134 and then extend upwardly into and through the openings 136. By the provision of the chains 132 and their connections with the shaft 5 and the locking-plates 135 it will be seen that when the handles 138 are grasped and the outer ends of the chains drawn through the locking-plates the wheels 131 will be rotated, so that the pinions 6, carried by the shaft 5, will move downwardly upon the teeth 8 in the segmental frames 7. This movement will elevate the machine-frame; but, on the other hand, when the chains 132 are released from locked engagement with the slots 137 and are permitted to pass in a downward direction through the openings 136 it is evident that the frames 7 will move downwardly, and hence permit the pinions 6 to move upwardly, so that the machine-frame may be lowered. The chains 138 are locked in the slots 137 by presenting one of their links edgewise thereto in a manner similar to the links of the cable 103.

A seat 139 is secured to the connecting brace-rod 63 in any suitable manner and is adapted for the use of the operator of the machine.

Figures 5, 14:
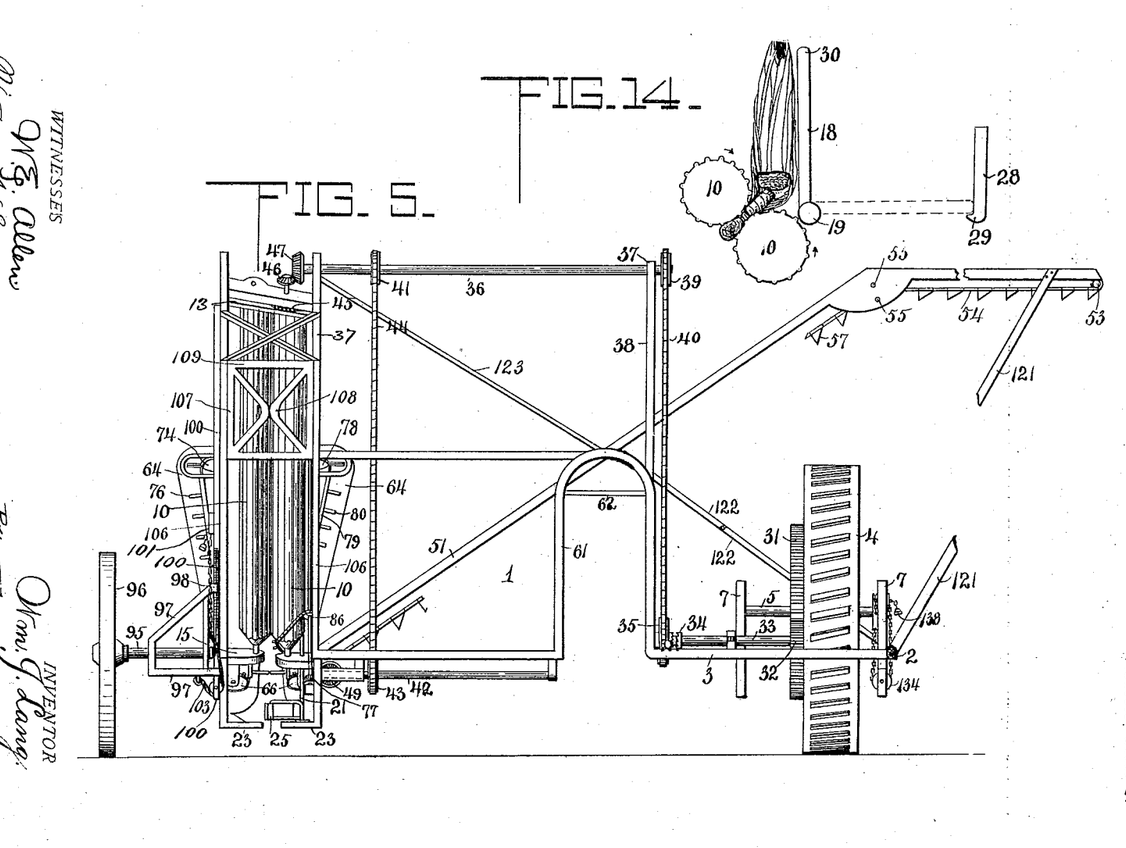
Fig. 5 is a rear end elevation.
Fig. 14 is an enlarged plan view of the husking-rolls and the deflector-board and illustrating the relation which the ears of corn bear to the husking-rolls just previous to the removal of the husks, the dotted lines illustrating the normal position of the deflector-board.
Figures 6, 7, 10, 11:
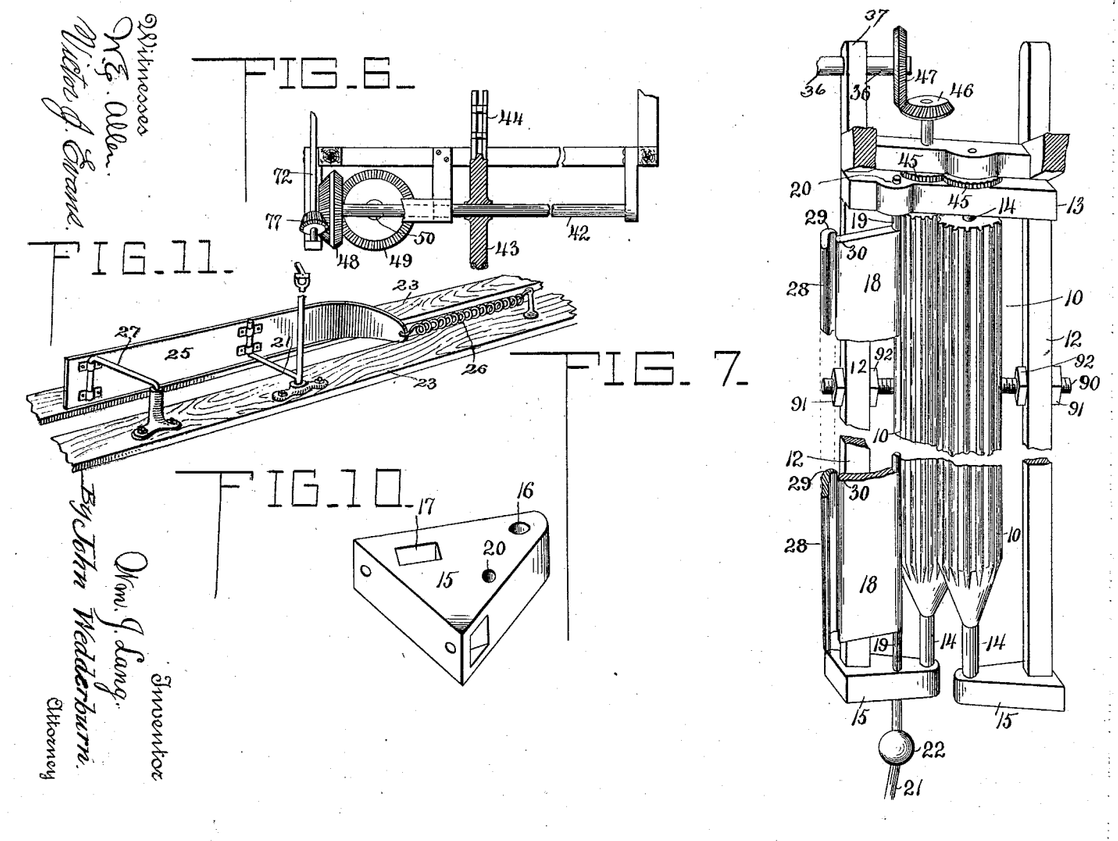
Fig. 6 is a transverse sectional view on the line 6 6, Fig. 3.
Fig. 7 is a detail perspective view of the husking mechanism and its connection, with the means for positioning the earns of corn in proper relation thereto for the husking operation.
Fig. 10 is a similar view of one of the journal-blocks for the lower ends of the husking-rolls.
Fig. 11 is a perspective view of the shoe and parts with which it is directly connected.

The operation of the herein-described corn-harvester is as follows: A team having been hitched to the tongue 110, the lever 117 is operated so as to position the guide-boards 23 at the proper distance from the ground. As the machine moves over the field the same is drawn along the rows of corn, so that one row is received by the guide-wings 64. It is apparent that when the driving-wheel 4 rotates the same through the intermediate gearing will impart motion to the husking-rolls 10 in the manner previously described, and the gathering-fingers 76 and 80 will also be operated from the driving-wheel. As the stalks of each hill are embraced by the gathering-fingers the former will be retained by the latter until the lower ends of the stalks have passed into and beneath the lower ends of the husking-rolls 10. At this point the lower ends of the stalks contact with the swinging shoe 25, which is forced toward the inner guide-board 23, and during this movement the crank-shaft 21 is partially rotated. By reason of this rotation of the crank-shaft 21 the deflector-board 18 is swung around from its normal position, (shown in dotted lines in Fig. 14,) so that the ears of corn will thus be forced to contact with the outer husking-roll 10 before the inner one. As the machine continues to move forwardly the shucks of the ears are engaged by the husking-rolls between the longitudinal ribs thereof, and the rotation of said rolls causes the shucks to pass on between the same. Immediately upon the ears contacting with the outer roll it is apparent that the same can pass no farther, and as the longitudinal ribs grip the shucks the latter are broken off and the husks carried thereby between the husking-rolls. This latter movement takes place while the lower ends of the stalks are passing between the swinging shoe 25 and the outer guide-board 23; but immediately after the stalks have passed the swinging shoe 25 the same is returned to its normal position by the spring 26, as previously explained, and the deflector-board 18 swung back to its normal position. The shucked ears are now free to descend to the lower ends of the husking-rolls, where they are caught by the cups 57 of the conveyer and carried thereby to the outer end of the trough 51, where they are deposited in the wagon which travels beside the machine. This operation continues as the stalks pass between the husking-rolls, and it will be observed that while the ears are husked from the stalks the latter remain standing.

If desired, the machine may be provided with means for cutting the stalks and bundling the same; but this is not essential.

From the foregoing description it will be seen that the herein-described improvements provide a corn-harvester which is adapted to husk the ears while the stalks are standing and to permit the latter to remain in this position, and it will also be observed that the various parts of the machine operate in a simple and efficient manner with comparatively few parts to become deranged, and the machine is adapted to accomplish the desired results with a minimum expenditure of power.

While I have illustrated a preferable embodiment of the machine, I wish it to be understood that I do not desire to limit myself to the details of construction herein shown and described, but reserve to myself the right to change, modify, or vary the same within the scope of my invention.

Having thus described my invention, what I claim as new, and desire to secure by Letters Patent, is—

1. In a corn-harvester, the combination with a passage-way, of a pair of picking-rolls arranged side by side, and one in advance of the other, at the rear end of said passage-way, a deflecting-board pivoted adjacent to the rear roll, so that its free edge may swing over to the forward roll for deflecting ears in their passage to the rolls, and means arranged in connection with the passage-way and adapted to contact with the standing cornstalks, for operating the aforesaid deflecting-board, and holding it in the required position, substantially as shown and described.

2. In a corn-harvester, the combination with the picking-rolls, of the deflector-board pivoted and adapted to deflect the corn-ears in their passage to said rolls, a slotted passage-way for the cornstalks, a pivoted and swinging shoe arranged in said passage-way, and means which connect it with the deflector-board, substantially as shown and described, whereby said board is operated by the shoe as specified.

3. In a corn-harvester, the combination with picking-rolls, one arranged in advance of the other, of a deflector-board, a passage-way for cornstalks, a shoe arranged in such passage-way and adapted to swing laterally and means which connect the shoe with said board, for operating in the manner described.

4. In a corn-harvester, picking-rolls arranged one in advance of the other, a deflector-board for deflecting the ears in their passage to the rolls, a shoe suitably connected to the deflector-board and adapted to operate the latter when contacted by the stalks of the corn, and means for returning the deflector-board and the shoe to their normal positions, substantially as described.

5. In a corn-harvester, picking-rolls arranged one in advance of the other, a bearing-frame for said rolls, journal-blocks carried by said frame and provided with bearings receiving said picking-rolls, a deflector-board journaled in said frame, a shoe suitably connected to said deflector-board and adapted to operate the latter, a passage-way for the cornstalks, the said shoe being arranged in such passage-way, and means for returning said shoe and the deflector-board to their normal positions when the husks have been removed, substantially as described.

6. In a corn-harvester, picking-rolls arranged one in advance of the other, a bearing-frame for said rolls, journal-blocks arranged upon said frame, and provided with bearings receiving the picking-rolls, a deflector-board journaled in said frame, a series of guide-boards disposed beneath the picking-rolls and spaced from each other, a series of cranks journaled upon one of said guide-boards, one of said cranks being suitably connected to the deflector-board, and a shoe carried by said cranks and closing the space between the guide-boards, whereby said shoe is adapted to be contacted by the stalks of the corn in the passage of the machine, and the deflector-board to deflect the ears in their passage to the picking-rolls, substantially as described.

7. In a corn-harvester, picking-rolls arranged one in advance of the other, a bearing-frame for said rolls, journal-blocks arranged upon said frame, and provided with bearings receiving the picking-rolls, a deflector-board journaled in said frame, a series of guide-boards disposed beneath the picking-rolls and spaced from each other, a series of cranks journaled upon one of said guide-boards, one of said cranks being suitably connected to the deflector-board, a shoe carried by said cranks and closing the space between the guide-boards, whereby said shoe is adapted to be contacted by the stalks of the corn in their passage through the machine and the deflector-board suitably positioned to deflect the ears in their passage to the picking-rolls, and means for returning the shoe and the deflector-board to their normal positions after the stalks have cleared the shoe, substantially as described.

8. In a corn-harvester, a frame, a driving-wheel journaled therein, picking-rolls journaled upon said frame, a deflector-board arranged adjacent to and above the picking-rolls, a shoe disposed below the picking-rolls and suitably connected to the deflector-board, whereby the latter is operated when the shoe is contacted by the stalks of the corn and positioned to deflect the ears in their passage to the picking-rolls, and a series of chains arranged in front of the picking-rolls and provided with gathering-fingers adapted to feed the stalks to the picking-rolls, substantially as described.

9. In a corn-harvester, a frame, a driving-wheel journaled therein, picking-rolls journaled upon the frame and arranged one in advance of the other, a deflector-board arranged adjacent to and above the picking-rolls, a shoe disposed below the picking-rolls and suitably connected to the deflector-board, said shoe being adapted to be contacted by the stalks of the corn to position said board for deflecting the ears in their passage to the picking-rolls, a conveyer arranged adjacent to the picking-rolls and adapted to receive the ears after the husks have been removed therefrom, and suitable gearing between the driving-wheel and the picking-rolls for operating the latter and the conveyer, substantially as described.

10. In a corn-harvester, a frame, a driving-wheel journaled therein, inclined picking-rolls journaled upon the frame and arranged one in advance of the other, a deflector-board arranged adjacent to and above the picking-rolls, a shoe disposed below the picking-rolls and suitably connected to the deflector-board, said shoe being adapted to be contacted by the stalks of the corn to position said board for deflecting the ears in their passage to the picking-rolls, a conveyer arranged adjacent to the picking-rolls and adapted to receive the ears after the husks have been removed therefrom, a series of chains arranged in advance of the picking-rolls and provided with gathering-fingers adapted to feed the corn to the picking-rolls, and suitable gearing between the driving-wheel and the picking-rolls for operating the latter, the conveyer and the chains, substantially as described.

11. In a corn-harvester, picking-rolls, a deflector-board arranged adjacent thereto and adapted to deflect the ears in their passage to the rolls, a guide-board arranged adjacent to the deflector-board, means for moving the deflector-board and means for returning it to its normal position, the guide and deflector boards forming a trough for the reception of the ears when the deflector-board is returned to its normal position, substantially as described.

12. In a corn-harvester, picking-rolls, a bearing-frame therefor, a deflector-board provided at its upper and lower ends with shaft extensions journaled in said bearing-frame, said board being adapted to deflect the ears in their passage to the rolls, means for moving said deflector-board, means for returning it to its normal position, and a guide-board arranged adjacent to the deflector-board, said guide and deflector boards being adapted to form a trough for the reception of the ears when the deflector-board is returned to its normal position, substantially as described.

In testimony whereof I have signed this specification in the presence of two subscribing witnesses.

WILLIAM J. LANG.

Witnesses:
WM. N. CROMWELL,
M. A. CROOK.